US009374471B2

(12) United States Patent
de Castro et al.

(10) Patent No.: US 9,374,471 B2
(45) Date of Patent: Jun. 21, 2016

(54) TEMPORARY USER ASSOCIATIONS BASED ON CALL STATE

(71) Applicant: TROPO INC., Menlo Park, CA (US)

(72) Inventors: Jose de Castro, San Francisco, CA (US); Wei Chen, Menlo Park, CA (US); Kevin Chatow, Menlo Park, CA (US); Jason Goecke, Half Moon Bay, CA (US); Michael Cervantes, Orlando, FL (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/591,876

(22) Filed: Jan. 7, 2015

(65) Prior Publication Data

US 2015/0195410 A1 Jul. 9, 2015

Related U.S. Application Data

(60) Provisional application No. 61/924,684, filed on Jan. 7, 2014.

(51) Int. Cl.

| | |
|---|---|
| ***H04M 3/42*** | (2006.01) |
| ***H04M 3/56*** | (2006.01) |
| ***H04W 4/08*** | (2009.01) |
| ***H04W 76/02*** | (2009.01) |

(52) U.S. Cl.

CPC ................ *H04M 3/567* (2013.01); *H04W 4/08* (2013.01); *H04W 76/02* (2013.01)

(58) Field of Classification Search

CPC ........ H04M 3/567; H04W 76/02; H04W 4/08

USPC ............ 455/416, 418, 569.1, 466, 414.1, 450

See application file for complete search history.

(56) References Cited

U.S. PATENT DOCUMENTS

| | | | | |
|---|---|---|---|---|
| 8,693,655 B1 * | 4/2014 | Chau | H04M 3/42008 | 379/201.01 |
| 8,824,341 B2 * | 9/2014 | Logan | G06Q 10/109 | 370/260 |
| 2004/0162881 A1 * | 8/2004 | Digate | G06Q 10/10 | 709/206 |
| 2014/0229618 A1 * | 8/2014 | Kumar | H04L 67/1044 | 709/225 |

* cited by examiner

*Primary Examiner* — Dhaval Patel

(57) ABSTRACT

A system for temporary user association based on call state, comprising a communication device; a call state engine; and a user association service. The communication device is a network-connected electronic device; the call state engine is a software application operating on the communication device and maintains a state model of the current operation of the communication device; the call state engine sends data to the user association service; and the user association service generates user association information based at least in part on data received from the call state engine.

10 Claims, 9 Drawing Sheets

270
Input Devices
260
Output Devices
250
Storage Devices
240
Memory
200
Client Applications
230
Shared Services
225
Operating Systems
220
Processor(s)
210

Servers
320
Databases
340
Configuration System
350
Network(s)
310
External Services
370
Clients
330
Security System
360
300

500

600

TEMPORARY USER ASSOCIATIONS BASED ON CALL STATE

CROSS-REFERENCE TO RELATED APPLICATIONS

This application claims priority to U.S. provisional patent application Ser. No. 61/924,684, titled "TEMPORARY USER ASSOCIATIONS BASED ON CALL STATE", filed on Jan. 7, 2014, the entire specification of which is incorporated hereby by reference.

BACKGROUND OF THE INVENTION

1. Field of the Art

The disclosure relates to the field of telecommunications, and more particularly to the field of forming associations between call participants.

2. Discussion of the State of the Art

In the field of telecommunications, users often need to collaborate or perform other functions with one another, such as via software applications on a communication device (such as a smartphone). Generally, these functions require them to have some knowledge of, or association with, one another, such as sharing contact information or knowing each other's account information for a software service they wish to use. This assumes the participants have some form of prior knowledge or association with each other, and precludes the use of such applications or services between two strangers or newly connected individuals, and also requires that users form more permanent connections in order to utilize desired functionality.

What is needed, is a means to temporarily associate participants such that they may utilize various products and services without forming more concrete connections or having prior knowledge, enabling them to fully utilize the functionality provided by such products or services regardless of their personal knowledge of, or connection with, another user.

What is needed, is a means to automatically recognize and establish temporary associations between individuals based on an established phone call or other communication connection, and make these temporary associations available to other products or services for use during communication.

SUMMARY OF THE INVENTION

Accordingly, the inventor has conceived and reduced to practice, in a preferred embodiment of the invention, a system and method for creating temporary user associations based on call state.

According to preferred embodiment of the invention, a method for dynamically handling conferenced communications is disclosed. According to the embodiment, a conference host or initiator may enable conferencing by any appropriate means (such as by configuring settings via a software application, or using special dialing codes or text messages, as described below with reference to FIGS. 5 and 6), after which new members or participants may join the conference by a variety of convenient means such as by simply dialing a known contact number for the host (i.e., their personal or office telephone line). When a participant connects to the host, they may optionally be verified with any configured conference settings (such as, for example, verifying whether a particular individual was given an invitation to the conference or was placed on a whitelist of approved participants), and may then be connected directly to the conference without needing to perform any special actions (such as giving their name or entering a special code to connect, as are common in traditional arrangements). In this manner, participants may easily and conveniently join a conference without needing to remember special information or perform special actions, simply by contacting the host via a previously known, familiar communications means.

According to another preferred embodiment of the invention, a system for dynamic conferenced communications comprising a conferencing server, a web server, an application server, and a CTI server, is disclosed. According to the embodiment, each server component may be a hardware or software component such as a dedicated computing device or a software service or application operating on a network-connected computing device, and it should be appreciated that a single network-connected device may operate multiple components (either multiple components of a single arrangement, such as a single computer operating both a web and application server, or components of multiple arrangements such as a single computer operating web servers for more than one system simultaneously).

According to the embodiment, a conferencing server may receive and handle conference requests via a network (such as, for example, a telephone network or the Internet, or any other suitable communications network), such as when an individual sets up a conference (via any of a variety of means, described below) or attempts to join a conference. A CTI server may receive and handle interactions via a telephone network, such as when an individual calls a phone number associated with a conference or inputs a dialing code via a telephone to configure conferencing. A web server may receive and handle interactions via the Internet or other data communications network, and may interact with an application server to provide interactive means over a network, In this manner, it can be appreciated that conferencing becomes possible regardless of the nature of a particular communications network, whether it may be via telephone call or internet communication, or any other suitable communication means.

According to the embodiment, a database may also be utilized such as to store and provide information related to conferencing, such as previously-configured settings or preferences, or logging of conference information, or any other such information that may be considered relevant or useful to a particular conference or to the function of a system in general. A database may be any suitable data storage means, such as hardware-based storage media (such as integral or removable storage media, for example optical storage discs or magnetic storage drives), or any of a variety of suitable software-based storage means (such as any of a variety of database schema common in the art), or any other suitable means for storing information for later use by components of a system.

In a preferred embodiment of the invention, a system for automatically creating temporary user associations based on call state, comprising a call state engine that may be a software application operating on a user's communication device, a user association service that may be a software module operating on a user's communication device, and an application integration service that may be a software module operating on a user's communication device, is disclosed. According to the embodiment, a communications device (such as a smartphone) may operate a call state engine that recognizes when a call or other communication takes place. The call state engine may then notify a user association service that a call is in progress, and the association service may then retrieve participant information such as contact information (such as a phone number or email address) or device information (such as hardware capabilities of a participant's communications device) and send this information to an application integration service. The application integration service may then present this information to external services or products such as social networking or file sharing software utilities, for utilization as a social connection or other association as appropriate according to the particular nature of an application.

In a preferred embodiment of the invention, a method for creating temporary user associations comprising the steps of establishing a communication link between a plurality of participants, form a temporary association between participants, and present the temporary association to external applications or services for use, is disclosed. According to the embodiment, when a call is established participants may be temporarily associated with each other for such purposes as presenting to external applications that may make use of social connections (such as collaboration or file sharing apps, as are common in the art), without requiring participants to explicitly create a more permanent association with one another (such as "friending" or other behavior common in social applications in the art).

It should be appreciated that while this application and several examples and arrangements described herein make reference to conferencing of telecommunications (i.e., a "conference call"), the invention is suitable for a wide variety of communication means including but not limited to audio (such as a telephone call), video (such as FACETIME™ or other video communications services or technologies), or text-based communications (such as via short message service (SMS) or other text-based chat technologies), and it should be further appreciated that a particular arrangement according to the invention may utilize multiple communications means interchangeably or simultaneously.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
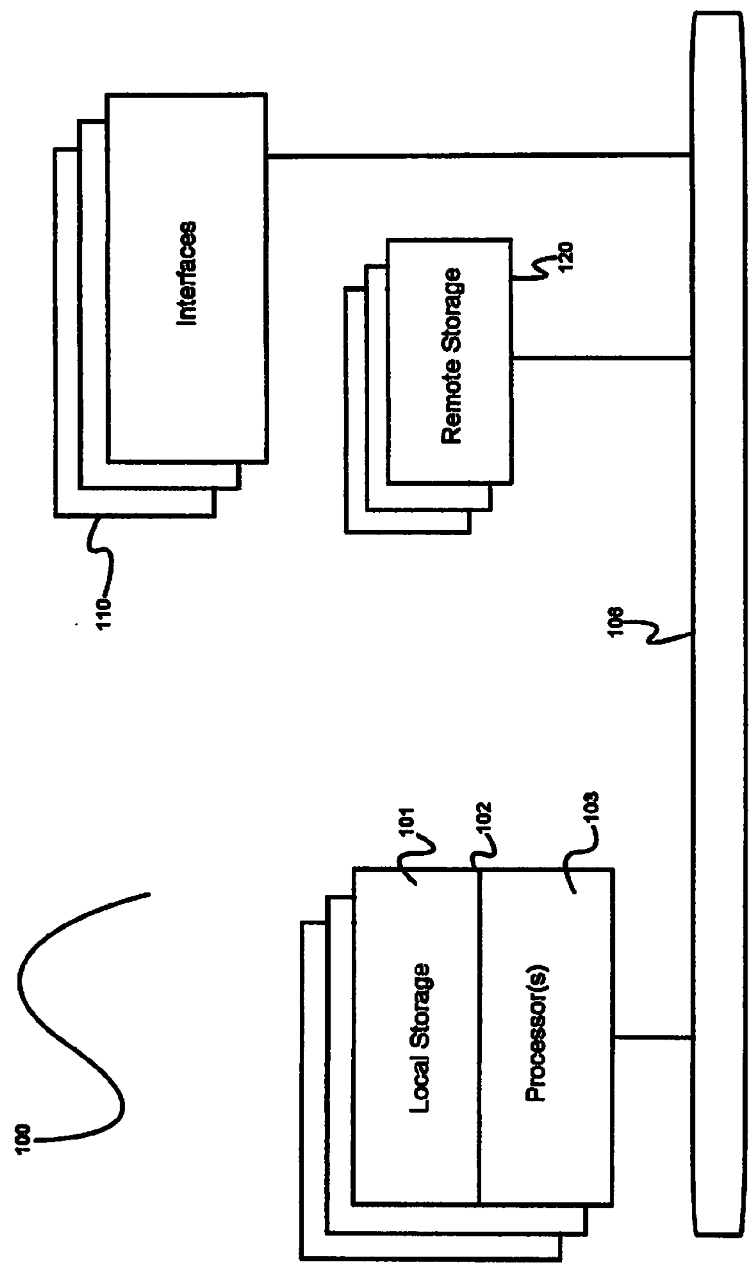
FIG. 1 is a block diagram illustrating an exemplary hardware architecture of a computing device used in an embodiment of the invention.

The inventor has conceived, and reduced to practice, a system and method for creating temporary user associations based on call state.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
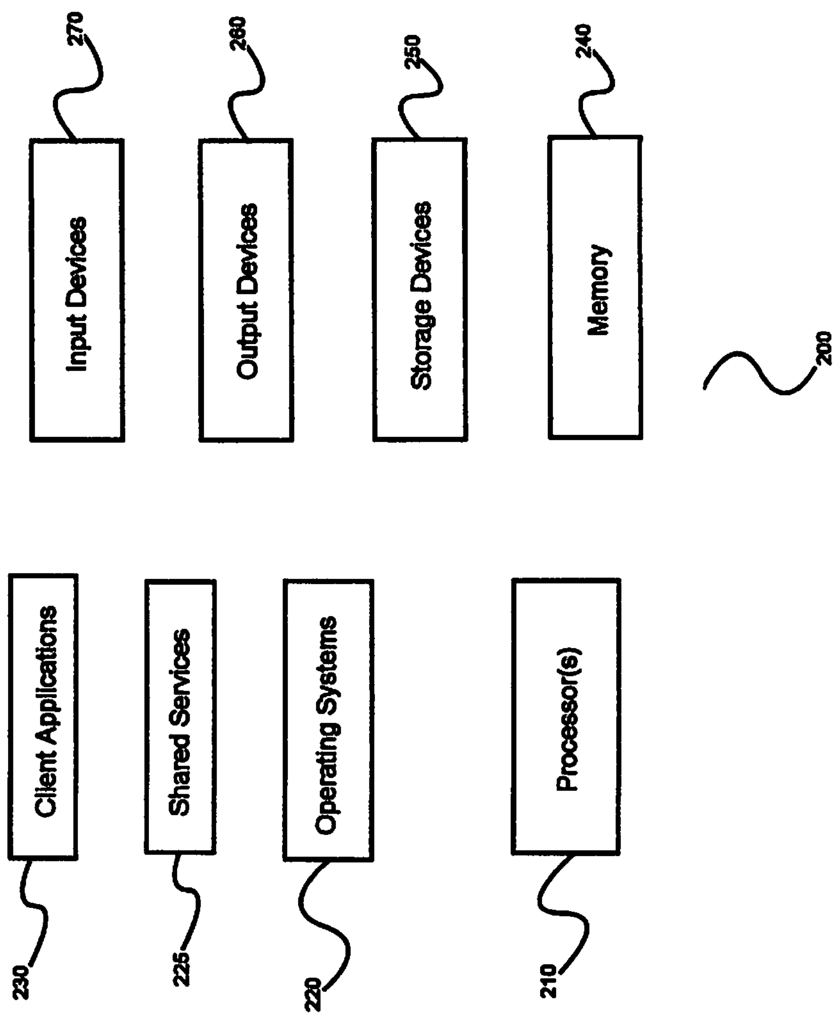
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
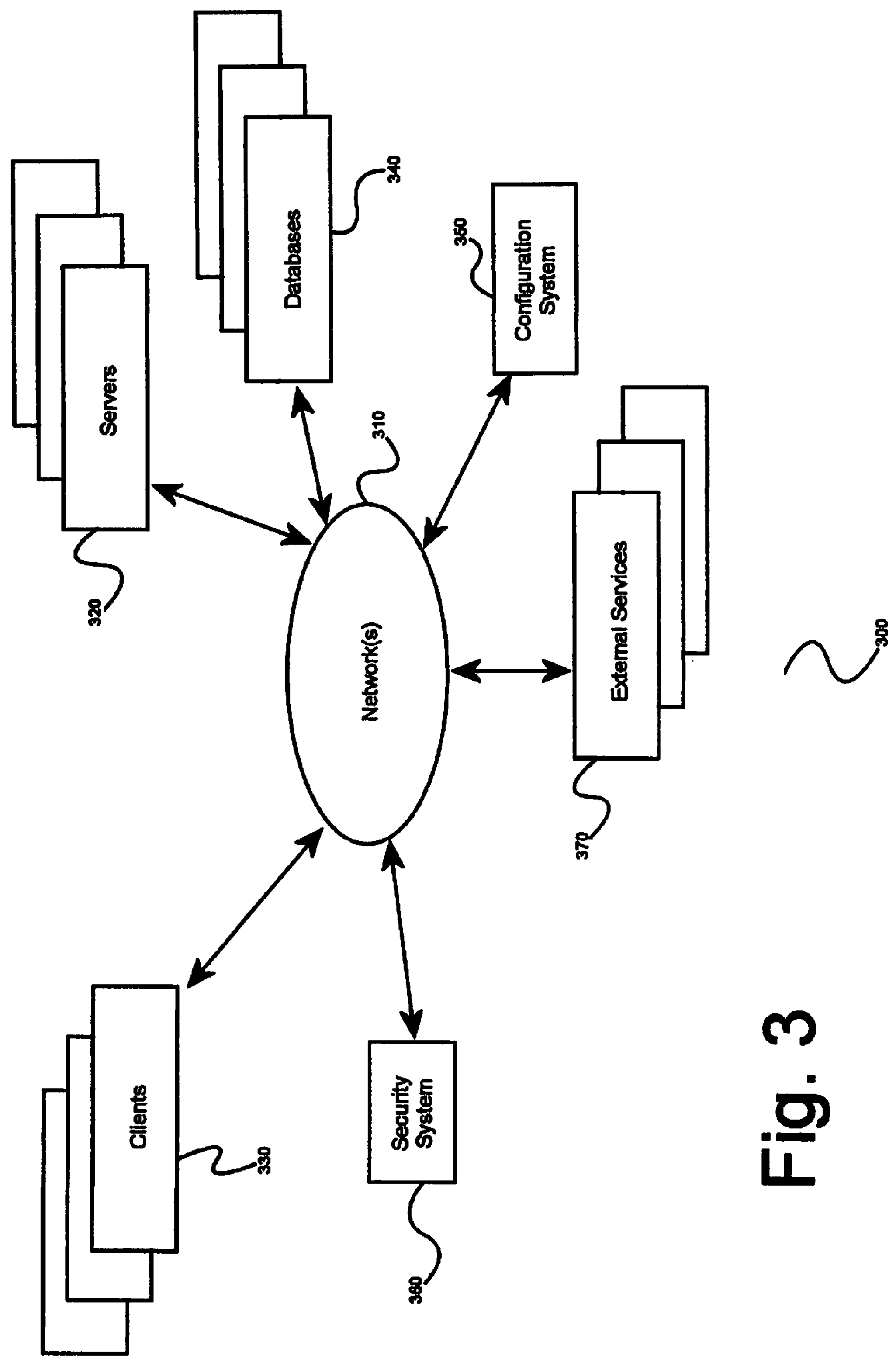
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
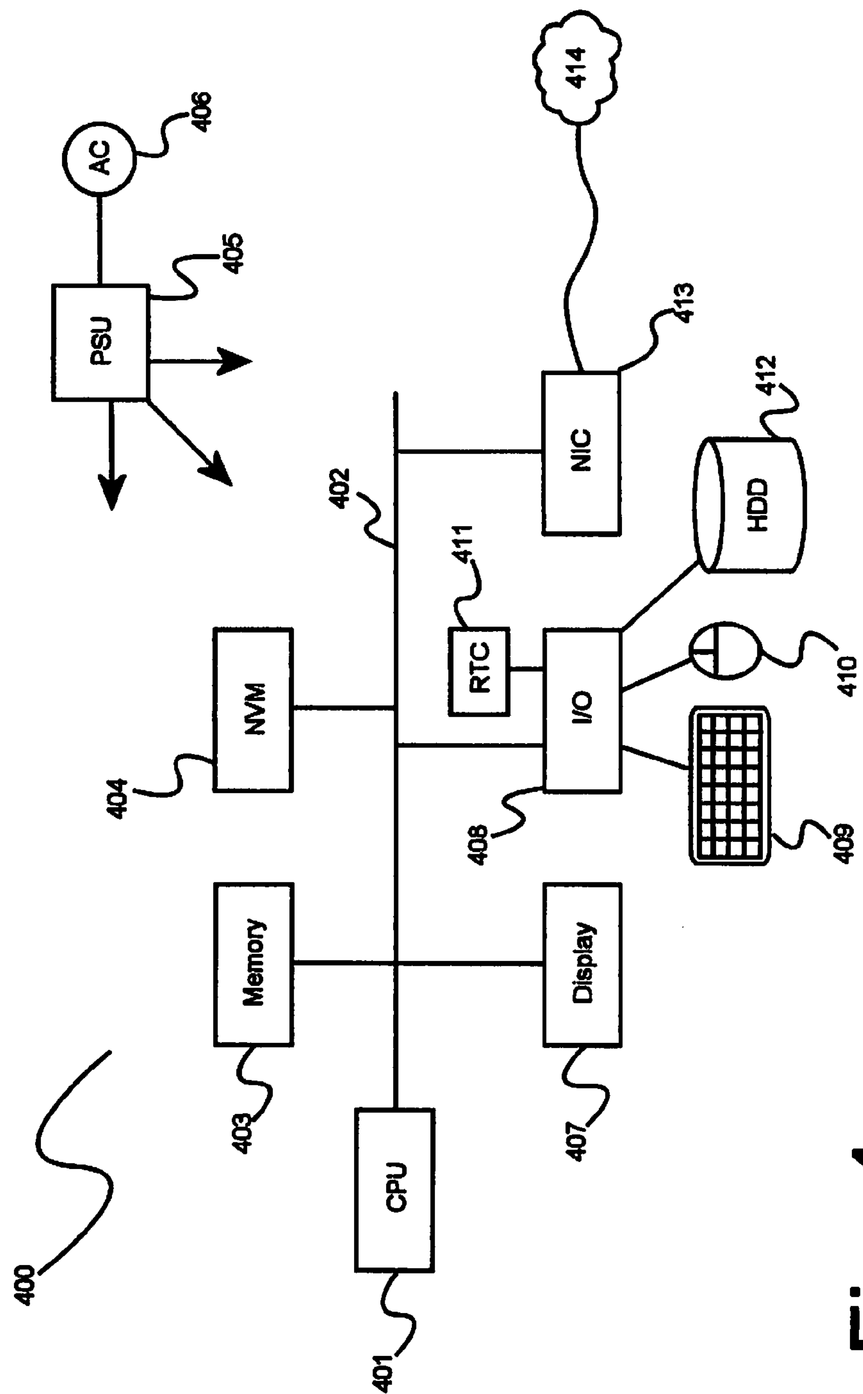
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
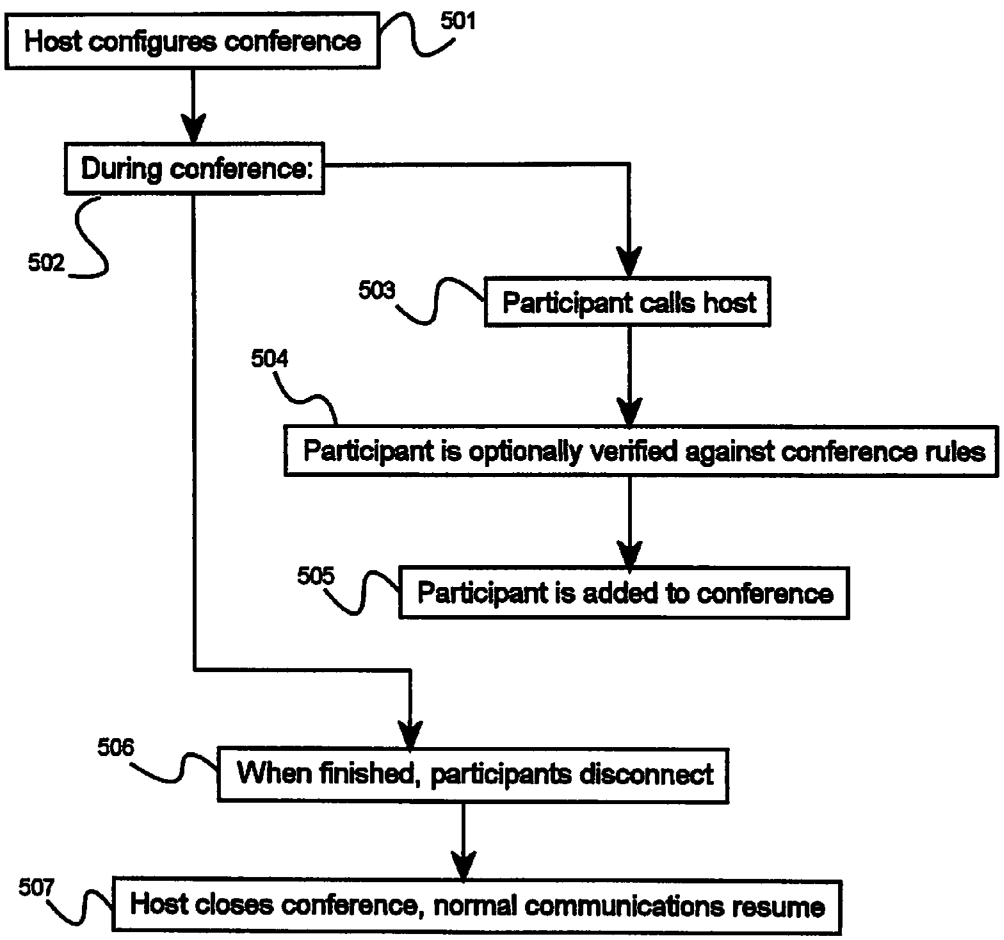
FIG. 5 is a method flow diagram of an exemplary method for dynamic conferenced communications, according to another preferred embodiment of the invention.

FIG. 5 is a method flow diagram, illustrating an exemplary method 500 for providing dynamic conferencing according to a preferred embodiment of the invention. As illustrated, in an initial step 501 an individual may setup a conference, such as when they wish to host a conference for other participants. This setup may be performed via any of a number of suitable means according to a particular arrangement, such as by computer interaction over the Internet or other data communications network (such as when the host is using a computer to interact with a configuration website or software application, or via interaction with a mobile application operating on a mobile computing device such as a smartphone, tablet computing device or laptop computer), or may be through telephone interaction such as using special dialing codes (as are commonly used in the art to perform special functions on a telephone, such as checking account information or retrieving voicemail messages), or via any other suitable communication means. For example, voice over internet protocol (VoIP) conferencing, group-based chat messaging, conference telephone calls, or other such conferencing arrangements may be possible according to the art.

In a next step 502, a conference may be initiated and made available to other participants to join. According to the invention, this initiation may be configured (either manually such as by a user, automatically or semi-automatically, or as a preconfigured or configurable stored or default option, or manually configured by a host in a previous step 501) to route all incoming calls (for example, according to an arrangement utilizing a telephone call conferencing arrangement) to a host's telephone number to the conference, such that anyone calling them would be added to the conference call (eliminating the need for special phone numbers, codes, or interaction with a call conferencing system as are commonly utilized in the art). During a conference, participants may attempt to join in a next substep 503, such as by calling a host's telephone number or otherwise interacting with a host's communication means (for example, by interacting with a mobile app or other software communication means, according to a particular arrangement or a particular device). In a next substep 504, participants may optionally be verified such as by comparing against a host's conference settings, for example to verify whether a participant is on a "whitelist" or otherwise marked as being allowed to join a conference (for example when a host wishes to have only specific participants, rather than allow anyone to join and participate), or whether a particular participant has met any prerequisites for participation (such as ensuring they have a compatible communications device, for example requiring all participants to be on a mobile phone with a camera for a video conference). Pending successful verification (if performed), a participant may be added to a conference and begin participation in a next substep 505.

In a next step 506, participants may disconnect from a conference (such as simply by hanging up the phone, or by manually disconnecting via other means), and when all participants have left a conference may be considered concluded (however, it is possible that other participants may join, therefore a lack of participants may not automatically close a conference). In a final step 507, a host may choose to manually close a conference, thus preventing any new members from joining, and normal communications resume (for example, calling their phone number now results in a "normal", one-on-one phone call rather than adding a caller to a conference for others to join). According to a particular arrangement, when a conference is concluded or otherwise inactive, it may be removed from a listing or otherwise hidden from view such that additional users may not be given an option to join or view a conference, for example by removing a listing in a directory or call listing of known conferences (for example as may be utilized in a mobile software app), or by hiding or masking a user's telephone number in a directory listing so that it is not available for selection, thereby preventing unwanted connection attempts from users when a conference is not desired.

In this manner, it can be appreciated that creating and joining conferences becomes very simple and convenient, as ordinary and familiar communication means may be utilized and no specific factors may be required for participation, encouraging accessibility and ensuring interoperability with the greatest number of users or devices. However, additional functionality remains via conference configuration, optionally allowing more specific requirements or preferences to be set, such that a host may retain the option to configure a conference exactly how they prefer, and both convenience and functionality may be available to them and other participants as appropriate according to their particular needs. For example, a host may choose to restrict the number of active participants in a conference, or set specific users that are allowed or required to participate, or other non-participant-focused requirements such as timers, topics, documents to be made required or available to at least a portion of the participants, device capabilities, or any other such criteria that may be desirable for use in configuring a conference. Additionally, it can be appreciated that adding new participants to a conference becomes simplified as well, as no special process is required and the only information needed to join may be a single phone number (such as when a conference is configured to route all calls to a host into the conference, as described previously in step 501), so a new participant may be given an "invitation" to an existing or future conference by simply giving them the host's contact information. This may be seen to ease participation for users, for example they may not be required to input any personal information to join such as a name or an access code, and they may come and go easily by simply connecting and disconnecting just as they might when communicating with an individual normally (i.e., when not conferencing).

It should be appreciated that while the context of a conferenced telephone call is described herein by way of example, the methods and arrangement described are equally suitable for any of a variety of communication means, such as voice over internet protocol (VoIP) calls (as might function very similarly to the telephone calls described above, generally utilizing an internet connection instead of a telephone network), video conferencing via such telephone or internet-connected video communication technologies as FACETIME™ or similar, or any other suitable means of communicating over a network.

Detailed Description of Exemplary Embodiments

Figure 6:
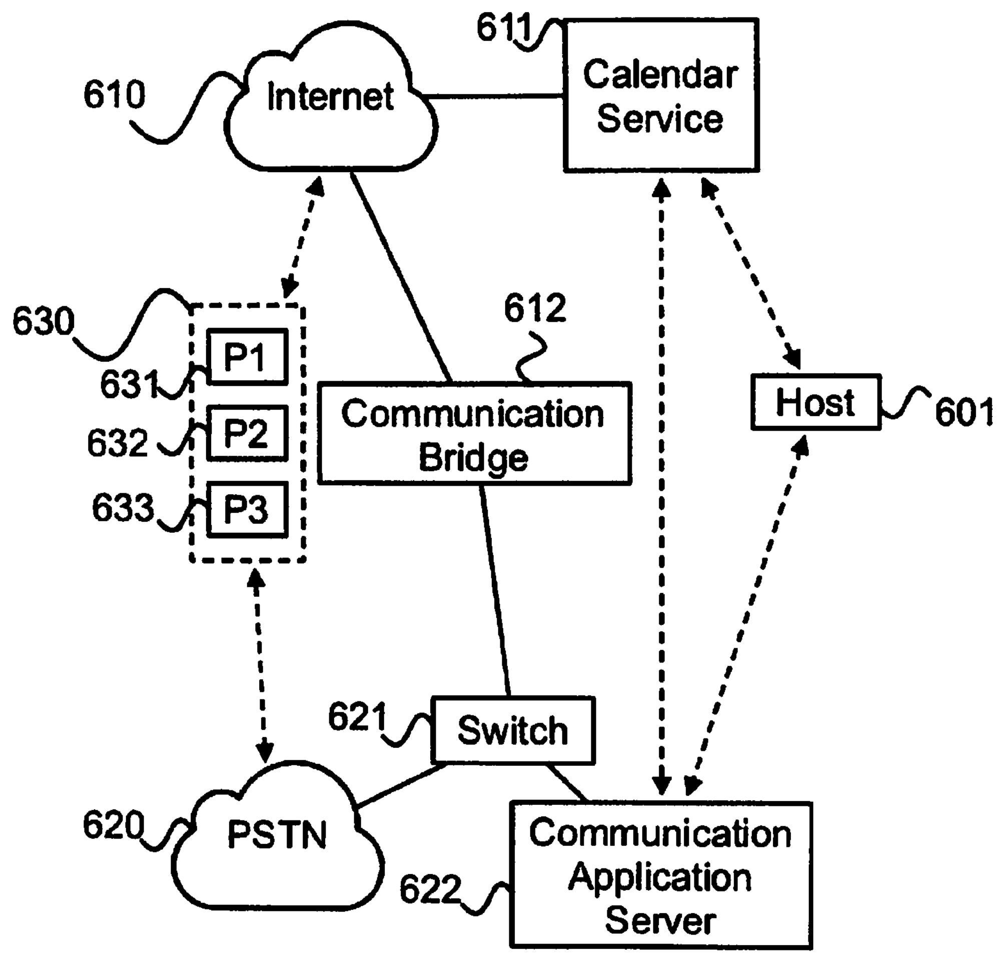
FIG. 6 is a block diagram of an exemplary system architecture for dynamic conferenced communications, according to a preferred embodiment of the invention.

FIG. 6 is block diagram of an exemplary system architecture 600 for dynamic communications conferencing, according to a preferred embodiment of the invention. As illustrated, a system 600 may comprise a host 601 that may be a user's electronic or telephony device capable of communicating over a network (such as a telephone, smartphone, tablet computing device, personal computer, or any other suitable communications device, the specific nature or capabilities of which may vary according to the embodiment and according to a particular arrangement), a data communications network such as the Internet 610 or other communication network, a public switched telephone network (PSTN) 620 or another telephonic communications network (such as, for example, a cellular network), and a plurality of participants 630 that may be additional devices capable of communication over a network, such as any combination of telephones, smartphones, mobile electronic devices, personal computers, or other suitable devices. According to the embodiment, host 601 and participants 631, 632, and 633 may be any appropriate network-connected device for communication, for example a personal computer, smartphone, or other mobile communications device and may connect to a communications network such as the Internet 610 or a PSTN 620 according to a particular device being utilized. Additionally, while reference is made to host and participant devices, it should be appreciated that such a role may also be accomplished using a software-based or virtual device, such as a software application stored in a memory and operated by an electronic device. For example, a plurality of software-based applications may be operated by a single smartphone or personal computing device, each app then optionally being suited for performing in the role of a host or participant according to a particular arrangement or use case. Additionally, through the use of virtual devices, simulated communication may be facilitated according to the embodiment, such as for testing purposes, wherein a plurality of software-based virtual hosts or participants may be used within a single electronic device or across a plurality of connected devices in communication with one another (such as via a data network or other suitable communication means), thereby simulating a conference without necessitating the construction or operation of actual communications or optionally without even utilizing devices that may actually be capable of performing the functions needed for actual conferencing operation.

As illustrated, a telephony switch 621 may be utilized and may be connected to a telephony network 620 such as to receive and route calls and other communications, as is commonly utilized in the art. A communications application server (CAS) 622 may be utilized as illustrated, and may comprise at least a suitable software program code stored in a memory and adapted to connect to a telephony switch 621 to receive relevant communications according to the invention, such as (for example) calls that may participate in a conference. Additionally, a CAS 622 may be adapted to perform conferencing functions such as operating a particular conference and connecting participants, or operating the configuration or other aspects of a conference or of particular hosts or participants (such as, for example, if a particular host wishes to store a user profile or other information to ease configuration in the future, such as by retrieving and utilizing stored or preconfigured settings to speed up the creation or management of a conference).

According to the embodiment, a host 601 may connect to a CAS 622, for example either directly such as via a software application for interaction (such as a mobile software app operating on a mobile device such as a smartphone) or indirectly such as via communication over an appropriate communication network 620 such as by calling a particular telephone number or utilizing a special dialing code (as are common in the art for performing special functions via a telephone handset). A host 601 may interact with a CAS 622 for such purposes as to configure or establish a conference (such as described previously, referring to FIG. 5), as may be appropriate when setting up a conference for immediate use, or configuring preferences or settings for future use, such as setting up default preferences for future conferences or setting up a particular conference in advance, such as for a scheduled time. Additionally, a host 601 may interact with a calendar server 611 (such as via a calendar app operating on a smartphone or other mobile communications device, or via an interactive website or other network-connected software via an appropriate network 610), such as to configure a scheduled conference or to send calendar invitations (as are commonly utilized in the art) such as to notify other individuals of a conference so they may participate. It should be appreciated that through various combinations of configuration options, a variety of arrangements and types of conference may be possible according to the invention, and that a wide variety of use cases may be served according to the configuration options utilized by a host.

As further illustrated, a communication bridge 612 may be utilized, such as to allow communication between networks (such as, for example, between a PSTN 610 and the Internet 620), such as to allow participants to communicate regardless of their particular devices or other considerations. For example, according to the embodiment, a host 601 may establish a conference with a CAS 622 via a telephone connection (such as by using special dialing codes to enable conferencing on their phone number, for example), and then participants 630 may connect via the Internet 610, as their interactions may be facilitated by a connection bridge 612 to allow communication with the CAS 622 according to the invention. Such an arrangement may be utilized, for example, when participants use devices with varying communication capabilities, such as when a portion of participants are using telephone devices while others may be using personal computing devices. In this manner, a conference may be facilitated without requiring specific devices or capabilities of the participants, and no participant should be prevented from joining a conference due to device limitations.

Figure 7:
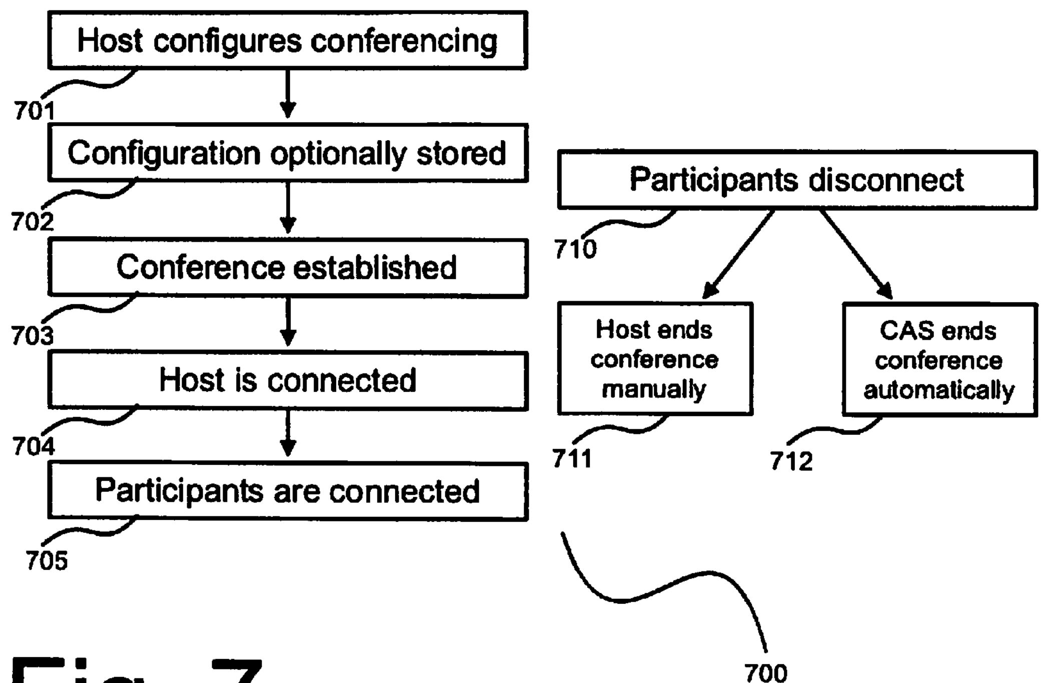
FIG. 7 is a method flow diagram of an exemplary method for conference call creation and teardown.

FIG. 7 is a method flow diagram of an exemplary method 700 for conference call creation and teardown, illustrating the general process by which a host may setup a conference (such as through interaction with a CAS as described previously, referring to FIG. 6), and subsequent closure or disconnection of a conference either by a host or by automated processes (such as might be performed by a CAS). In an initial creation step 701, a host may connect to a CAS to configure a conference. Such a connection may vary in technical nature, for example a host may connect via a PSTN such as by entering special dialing codes on a telephone handset or by calling a special telephone number (such as might be utilized to put the host's device in "conference mode", or to notify a CAS that a conference is being created), or by interaction via a network-connected software application such as a mobile app operating on a smartphone or other mobile communication device, or a website or other interactive Internet-connected software for conference configuration. In a next step 702, this configuration may optionally be stored such as in a database or physical storage medium (for example, integral or removable storage media such as magnetic or optical storage drives), such as to use in future conference configuration (such as a host establishing preferred "default" settings for future conferences to expedite their creation). Storage of conference configurations may be used to easily create preferred settings or a default conference configuration that may optionally be loaded when creating new conferences in the future, expediting a setup process or ensuring consistency of operation between multiple conferences over time. Additionally, it should be appreciated that stored configurations or portions thereof may be shared between devices or users, for example by sending via a software application on a device, such that a host may share preferred settings or other configuration information with other users. For example, after a conference is concluded a host may choose to share the configuration with some or all participants, ensuring they know what to expect in future conferences or can set up a similar one of their own if desired (as may be useful in various business arrangements according to the embodiment).

In a next step 703, a CAS may establish a conference based on configuration (such as either a predefined or stored configuration as described previously, or manually-configured settings as performed in an initial step 701), at which point a conference may be considered "live". It should be appreciated that there may be an arbitrary time delay as appropriate between steps, for example a host may configure a conference to be established at a determined future time or optionally as triggered by an event (such as setting up a conference to be initiated when a particular individual calls them, or when a particular notification is sent to a CAS by an external program or service, such as might be utilized to facilitate integration with third-party products or services). In a next step 704, a CAS may (if appropriate) contact a host to establish their presence in a conference, such as when a future-dated conference is initiated (for example, a CAS may call a host to begin the conference, rather than requiring them to stay connected during an interim time period). In a final step 705, participants may join a conference such as by dialing in to a host's telephone number or via another appropriate contact means, or interchangeably a CAS may contact participants (such as in a manner similar to contacting a host in a previous step 704), to bring them into a conference when appropriate. For example, a host may configure a conference with a set of chosen participants to be included, and a CAS may contact them at the appropriate time (i.e., when a conference begins) to notify them and give them the opportunity to join the conference. Optionally, additional participants may be permitted to join a conference in progress according to a particular configuration. It should be appreciated that such functionalities of a CAS in general or a specific conference in particular, may further comprise interaction with various external products or services such as calendar applications, contacts storage, or file hosting services, for example to expand the functions described above such as to facilitate file sharing between conference participants, notification to a plurality of participants via known or available contact information, or scheduling and alarm functionality as may be desirable for conference operation or configuration. Such interaction or integration may be accomplished in a variety of ways common in the art, such as (for example), using a software application programming interface (API) or other such means to facilitate integration or interaction with external software products or services, as well as to enable further development of additional software adapted to interact with a CAS or a conference according to the invention.

In a first teardown step 710, participants may leave a conference such as by hanging up their phones or otherwise disconnecting from the interaction. In a next step 711, a final participant may disconnect, such that only a host remains in a conference. At this point, according to a particular configuration (such as may have been established in a setup step 701), a host may manually end a conference in a manual end step 712 (such as by interaction with a software element or by using a special dialing code to stop conferencing on their telephone line or remove their contact information from a conference listing or directory, or any other appropriate manual interaction means according to a particular configuration), or a CAS may automatically close a conference when the appropriate conditions (such as might have been manually configured during setup in a step 701, or retrieved from stored or default configuration as described previously), for example when the last participant has left or after a configured time period (such as for a conference with a defined start and end time). Additionally, a CAS may (as appropriate) notify participants that the end of a conference is approaching, such as via an audible tone or message, or via a text or video-based notification, according to a participant's particular device or connection or a particular conference configuration. For example, in a conference with multiple participants utilizing different devices with different communication capabilities, a participant on a telephone handset may be notified of an approaching timer (such as the scheduled end of a conference) via an audible tone, while a participant on a smartphone or similar mobile device may be notified via a pop-up message or push notification shown on their device screen, or via a vibration notification as are common in the art.

Figure 8:
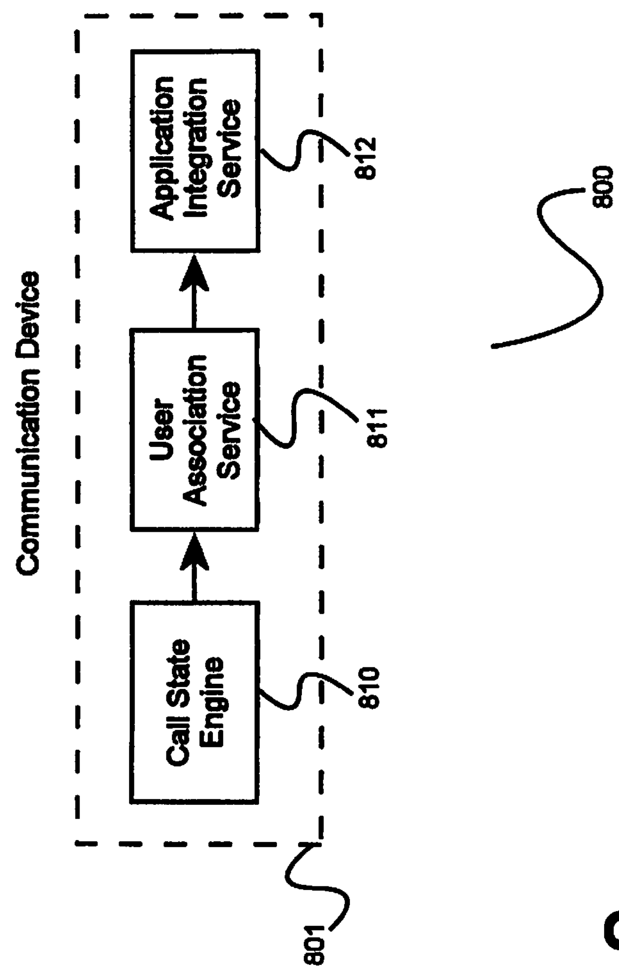
FIG. 8 is a block diagram of an exemplary system architecture for creating temporary user associations based on call state, according to a preferred embodiment of the invention.

FIG. 8 is a block diagram of an exemplary system architecture 800 for creating temporary user associations based on call state. As illustrated, a call state engine 810 may comprise a software program code stored in a memory and operating on a network-connected communication device 801 (such as a smartphone or similar device capable of communicating via a network), such as may be utilized by a conference participant as described previously (referring to FIG. 6), and that may maintain an internal state model of the device's operation (for example, continually monitoring whether or not the device is in active communication with another user's device, i.e. "in a call"). It should be appreciated that such functionality is a common feature of communication devices in the art, for example a smartphone may monitor whether or not a call is established, and present a user with varying features or functions available based on whether or not they are actively in a call, as well as maintaining internal state information pertaining to information stored on, or capabilities offered by, the device (such as a user's stored files, contact information, location, or other such available information).

When a call is established, call state engine 810 may recognize that the device is now "in a call", updating an internal state model accordingly and notifying a user association service 811 that a call is now taking place. It should be appreciated that user association functionality may be provided whether a call is placed outbound (such as a user dialing a number on their smartphone or other device, initiating an outbound contact attempt to another device or party), or received inbound (such as when a third party calls a user, and the user answers on their device) in nature, and it should be further appreciated that such operation or specific behaviors may optionally be configurable to only take place on an inbound or outbound call selectively, according to the invention. For example, a user may not wish to form temporary associations with everyone they call, so they may select to only allow such behavior during inbound calls. Such an arrangement may be desirable, for example, on a user's work device. The user may only give the device's phone number (or other contact details) to business associates or clients, and wish to form temporary associations with them for business purposes while restricting such association functionality on outbound calls, as they may use the work device for placing outbound personal calls or other contact with parties they may not wish to form associations with.

A user association service 811 may then retrieve information pertaining to call participants, such as names or contact information, as well as any potentially-relevant information regarding their devices or other capabilities (such as whether or not a participant's device has a video camera or other video recording hardware). This information may be received from a call state engine 810, for example a participant's phone number or device information that might be immediately available as part of a call (for example, if participants are in a two-way video call then it may be inferred that both are using devices capable of video capture), or it may be obtained by polling a participant's device such as by requesting information from a participant's device (such as device capabilities that may generally be made available to software applications and may optionally be configurable by a device's user, as is common behavior in the art). Any resulting information may be presented to an application integration service 812 as a user association, for example providing contact information and device hardware capabilities to be made available to external applications for use according to their purposes (such as, for example, sharing a live video from one device to another, based on information that a device has video capture hardware and the needed contact information for both parties is known).

An exemplary use of temporary user associations may be seen in the use of participant devices for conferenced video communications (such as described previously, referring to FIG. 6). According to the example, a user may dial another party's phone number on their device (such as a smartphone, or other network-connected communication device that may be capable of video communication). When the call is established (such as when the other party answers the incoming call on their device), a temporary user association may be formed between the two participants, as described above. The initiating user may then operate a software application for video communication, such as SKYPE™ (for example). Ordinarily, with such software it is common to require users to know each other in some manner (such as explicitly sharing contact details within the app, or other specific action to declare an association) before functionality such as video communication may be available. According to the example, when utilizing SKYPE™ a user may be required to enter another user's contact details (such as a username, email address, phone number, or other personal information to identify a specific user) and send them an invitation to exchange information and declare their association as contacts. When the other party accepts the sent invitation, their information is exchanged and video communication may become available. According to the invention, this becomes unnecessary as the temporary user association formed when a call is established may be used to associate the users, and video conferencing functionality may be made available immediately without the need of an invitation process. When the two participants end their call, the temporary user association is erased and when either user then views their SKYPE™ or other software app, they will not see the other user's information in their contacts list (unless they otherwise explicitly declared a more permanent association).

Examples of third-party software applications for integration (as described above) may be communication software such as SKYPE™ (as may be utilized for audio or video communication or file sharing between participants with compatible devices), FACETIME™ (as may be utilized for audio or video communication between participants with compatible devices), SMS services (as may be utilized for sharing of text-based information such as website URL information, personal details, or other small quantities of text as may be appropriate for communication via an SMS service), email (such as to send files or text-based information between participants). Such software programs may be operating on a user's device and may automatically receive a temporary user association from an integration service 812, such as during startup when the software might ordinarily check for known contact information for use during operation (such as by checking a user's contact lists stored on their device), or they may explicitly request any temporary associations (such as if a user configures their device to require authorization before making such information available between software applications, as is a common practice with computing devices in the art). In this manner, regardless of the nature of a third-party software application or its functionality, a temporary user association may be utilized as appropriate and a user may optionally be given some manner of control over such behavior through software or device configuration.

An example of a third-party software application utilizing integrated temporary user association behavior via an API may be a cloud-based storage or sharing service, such as DROPBOX™ or a similar service. Such services often allow users to share files they have uploaded or stored in the cloud, such as by generating a URL for access through a web browser. According to the invention, by integrating temporary association functionality, such a service may allow easier file sharing by giving a user an option to "share with" a participant of a call. Such an option may optionally be visible at all times, alerting a user that such functionality is available even if they are not presently participating in a call, or it may only be visible during a call (such as to maintain a clean interface by not displaying functions or options that are not currently useful). In this manner, a user may quickly share a file with someone via a temporary user association, without any additional steps that may be required without such integration (such as generating a share URL, then copying it, then returning to a call or other communication software to send the copied URL to another participant). When receiving a file in this manner, an integrated service may prompt the user to open the shared file within the appropriate app upon receipt, since the temporary user association is already known and integrated with that app's operation (rather than, for example, requiring the user to open a shared URL in their web browser, then download the file that was shared, and then select an application to open it).

Another example of third-party software integration may be two users participating in a FACETIME™ or similar communication service. Such services may allow audio or video communication using participants' email addresses or other contact information, as opposed to a telephone number traditionally needed for such purposes. During such a call, a participant may wish to send an SMS or other message to another participant, which would normally require them to know the other party's phone number. According to the invention, a temporary user association may be made available to an SMS service or software application, and participant devices may be prompted to share other contact or device details with one another (such as a phone number associated with a device or the device's user), without making such information available to the user. For example, the devices may provide their associated phone numbers without displaying that information or making it accessible to a user, such as by automatically attaching it to an SMS or other message after a user chooses to send it, without ever displaying it to the user (instead displaying a placeholder, or contact information already known to the user, such as an email address used to establish a FACETIME™ call). In this manner, messages may be sent between participants without needing or revealing their phone numbers. When the call is finished, the temporary association is erased and neither party has revealed their phone number (unless they otherwise explicitly chose to share such information with each other). In this manner, various features and functions may be available to users regardless of how much or how little contact information they have for one another, thanks to their temporary association with each other.

Examples of third-party devices that may be integrated (as described above) may be external communications hardware such as a headset or microphone (as may be utilized for communication between participants), external computing devices such as a personal computer or another communication devices (such as might be utilized for sending files or emails between participants), data storage devices such as external hard disk drives or flash storage devices (as may be utilized for retrieving files or information to send between participants), or any other hardware that may be desirable for use during interaction between two parties and may be linked with a communication device (such as pairing via BLUETOOTH™, or connecting via a cable or other physical connection means) for device interaction. Such devices may, as described above, automatically receive a temporary user association or they may optionally request any known user associations explicitly, according to their function or configuration.

An exemplary use of an external device may be the use of an external hard drive (or any other data storage device) for file storage. During a call between two participants, one participant may connect an external storage device to their communication device, such as to give another participant access to files for collaboration or sharing. Ordinarily, the storage device may be configured to require user authentication such as to verify that only authorized individuals (such as the device's owner, or coworkers within a specified department, or any other such configurable criteria for access), and thus in order to grant access to another individual the device's owner (or other authorized user) may be required to establish a user account or other explicit means of authorization. According to the invention, this becomes unnecessary as a temporary user association may be utilized to grant access, for example if a device's owner has access to data on a storage device, any users temporarily associated with them (such as call participants) may be automatically authorized by association. When a call is ended, this temporary association is erased and the third party may no longer be given access to data, as they are no longer associated with the device's owner, thereby preserving security while allowing ease of access. It should be appreciated that such behavior may be highly configurable, such as via a storage device's access configuration (or any other configuration for authentication on a device, according to the nature of the device), for example specifying that particular users with access to the data may be allowed to share with temporary associates, while other users may have that function restricted, or any other such arrangement as may be desirable according to a particular device or implementation.

It should be appreciated that an application integration service 812 may be a software or hardware module operating on a user's device (such as a smartphone app or background service), or may be an application programming interface (API) allowing software developers or administrators to integrate their particular applications with the functionality provided. In this manner, the integration between an application and the temporary user associations may be provided when appropriate (such as when a developer has added the functionality to their product or service) but may not be available when it is not desired, without limiting functionality of the device, app, or inhibiting the function of the call itself (as might occur if an integration were attempted with an incompatible application). Additionally, a user may be given some measure of control over the behavior of integration, such as by allowing configuration of the behavior of temporary associations or their integration with other apps (such as, for example, by allowing a user to select which apps are allowed to access calls made on their device for forming temporary associations, as is a common functionality with smartphones in the art for controlling access to various hardware and software features such as location services or cameras).

Figure 9:
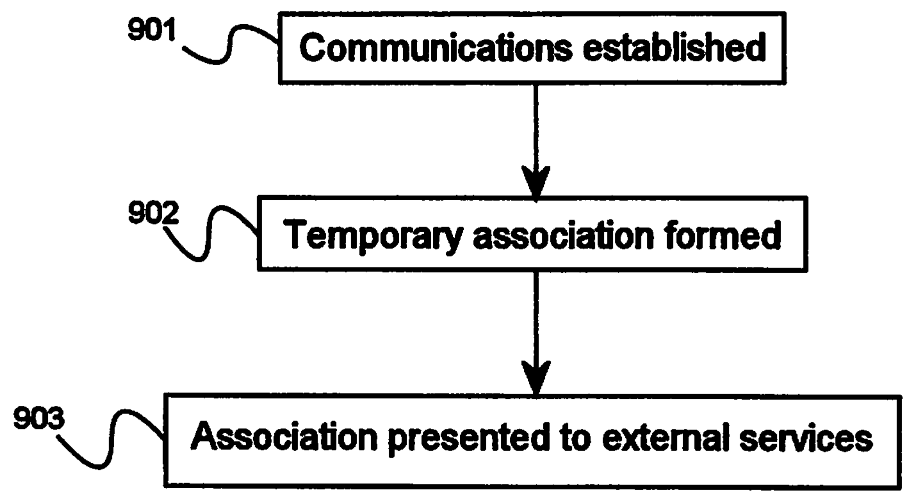
FIG. 9 is a method flow diagram of an exemplary method for creating temporary user associations based on call state, according to a preferred embodiment of the invention.

FIG. 9 is a method flow diagram illustrating an exemplary method 900 for establishing temporary user associations based on call state, according to a preferred embodiment of the invention. According to the embodiment, in an initial step 901, a communication link between a plurality of participants may be established, such as by connecting a phone call between two or more parties. In a next step 902, a temporary association between participants may be established, such as by utilizing any available contact or device information pertaining to each participant. In a next step 903, the temporary association may be presented to external applications or services for use, such as for use in any of a variety of social applications or services for such purposes as collaboration, file sharing, enhanced communication (such as by adding video communication to an existing audio-only call), or other purposes that may make use of apparent associations between users. According to the embodiment, when a call is established participants may be temporarily associated with each other for such purposes as presenting to external applications that may make use of social connections (such as collaboration or file sharing apps, as are common in the art), without requiring participants to explicitly create a more permanent association with one another (such as "friending" or other behavior common in social applications in the art).

An exemplary use case for temporary user associations may be that of a user with a smartphone calling someone they may need to speak with but do not know personally, such as a coworker in a different area or department. For example, an insurance adjuster "Bob" may be on the scene of an automobile accident and observing the situation, and decide to call someone at a contact center for their company to get a second opinion on the event. Bob may make a call and be connected to a contact center agent "Sam", at which point his device recognizes the connection and establishes a temporary association between the two call participants (even though they do not know each other and this may be the first time they have had any contact). During their conversation Bob may decide to send a video and show Sam the scene through his device, and he opens a software application for video capture and sharing on his smartphone. At this point, the temporary association between the users is available to the video-sharing app on Bob's device, and he is presented with an option to share video with Sam even though he may not have contact information for Sam or know any of Sam's details relevant to the video sharing service. Bob chooses to share the video and begins to capture the scene with his device's camera, giving Sam a first-person view of the incident for better assessment. When the call is completed, the temporary user association is disbanded, and the video sharing service stops connecting the two users. No information was explicitly shared between the two participants, and they may retain no information on one another, but they were able to utilize social functions that would otherwise have required them to manually establish some sort of connection (such as by exchanging contact information, such as each other's video sharing account username or other information).

It should be appreciated that user associations may be created regardless of the scope or quantity of information received, such that an association may be reliably formed and any specific details may optionally be left unknown at the time of creation. An example of such behavior may be the forming of an association between two participants with only their phone numbers (obtained from an initial call) to identify them. In such an instance, when a user attempts to utilize an external application such as for file sharing, it may be left up to that application to locate any additional user information that may be necessary for participation, such as using a phone number to lookup any known account or device information to ensure they are capable of utilizing the product or service selected.

An example of creating a temporary user association based on minimal information may be the utilization of a participant's phone number to locate their account information for a particular software application or service (such as if their phone number was previously associated with an account for that application or service), such as to look up any previously-stored files associated with that participant's user account. In this manner, it may be seen that social or collaborative functions may be made available to call participants that would ordinarily (according to traditional operation) not be possible without first explicitly creating a more permanent association such as by requiring users to exchange contact information or add each other as "friends" (or similar association) within a particular application or device before being able to access some or all functionality. In this manner, temporary or call-based associations may be formed and made available to a variety of software applications operating on a user's device.

The skilled person will be aware of a range of possible modifications of the various embodiments described above. Accordingly, the present invention is defined by the claims and their equivalents.

What is claimed is:

1. A system for temporary user association based on call state, comprising:

a dynamic communications conferencing computer comprising at least a memory and a processor and further comprising programmable instructions stored in the memory and operating on the processor, the instructions configured to provide temporary user associations and to provide external communication services for a plurality of users based on call state comprising:

a communications application server configured to:

enable communications between a plurality of participant devices;

configure access criteria for the plurality of participant devices;

receive a plurality of communication requests from the plurality of participant devices;

periodically receive a plurality of call states from a first participant device;

an association service to create a temporary association between one or more participant devices of the plurality of participant device;

a call state engine configured to:

maintain an internal state model based on the call state of the first participant device, identify a plurality of available external communication services of the first participant device based on the internal state model;

wherein the plurality of external communication services of the first participant device is associated to the temporary association based on the capability of the first participant device;

wherein a plurality of external communication services of the second participant device are associated to the temporary association based on the capability of the second participant device;

wherein communications are enabled from a first external communication service of the first participant device to a first external communication service of the second participant device;

wherein the first external communication service of the first participant device is compatible with the first external communication service of the second participant device; and, wherein specific access criteria for the first external communication service of the first participant device and specific access criteria for the first external communication service of the second participant device are not required to enable communications via the external communication services.

2. The system of claim 1, further wherein the behavior of the call state engine may be configured by the first participant device communication device.

3. The system of claim 1, further comprising an application integration service, wherein the application integration service is a software application operating on the first participant device.

4. The system of claim 3, wherein the association service provides the temporary association information to the application integration service.

5. The system of claim 4, further wherein the application integration service provides the temporary association information to software applications and services operating on the first participant device.

6. The system of claim 4, further wherein the application integration service provides the temporary association information to software applications and services operating on external hardware devices connected to the first participant device.

7. The system of claim 4, further wherein the application integration service provides the temporary association information to hardware devices connected to the first participant device.

8. A method for temporary user associations based on call state, comprising the steps of:

deploying a dynamic communications conferencing computer comprising at least a memory and a processor and further comprising programmable instructions stored in the memory and operating on the processor, the instructions configured to providing temporary user associations and for enabling external communication services for a plurality of users based on call state comprising the steps of:

enabling, at the communications application server, a conference to enable communications between a plurality of participant devices;

configuring, at the communications application server, access criteria for the plurality of participant devices;

receiving, at the communications application server, a plurality of communication request from the plurality of participant devices;

periodically receiving, at a communications application server, a call state from the first participant device;

maintaining, at the communications application server, an internal state model based on the call state of the first participant device;

identifying, at the communications application server, a plurality of available functions of the first participant device based on the internal state model;

associating a plurality of external communication services of the first participant device to the temporary association based on the capability of the first participant device;

creating, at an association service, a temporary association between the first participant device and a second participant device;

associating a plurality of external communication services of the second participant device to the temporary association based on the capability of the second participant device;

enabling communications from a first external communication service of the first participant device to a first external communication service of the second participant device;

wherein the first external communication service of the first participant device is compatible with the first external communication service of the second participant device;

wherein specific access criteria for the first external communication service of the first participant device and specific access criteria for the first external communication service of the second participant device is not required to enable communications.

9. The method of claim 8, wherein a primary access criterion is a telephone number.

10. The method of claim 8, wherein the first external communication service of the first participant device is video conferencing.

* * * * *